United States Patent [19]
Sakellaropoulos

[11] Patent Number: 5,790,279
[45] Date of Patent: Aug. 4, 1998

[54] COMBINED SCANNER, PRINTER AND FACSIMILE APPARATUS

[76] Inventor: Spiro Sakellaropoulos, 740 Montpellier #1601, St. Laurent, Quebec, Canada, H4L 5B1

[21] Appl. No.: 837,398

[22] Filed: Apr. 17, 1997

Related U.S. Application Data

[63] Continuation of Ser. No. 527,697, Sep. 13, 1995, abandoned.

[51] Int. Cl.⁶ .................................................. H04N 1/04
[52] U.S. Cl. .......................... 358/498; 358/472; 358/474; 358/442
[58] Field of Search .................................. 358/472, 400, 358/434, 442, 468, 474, 496, 498, 473; 395/113, 114; 379/100; 399/367, 369, 373; H04N 1/00, 1/04, 1/32

[56] References Cited

U.S. PATENT DOCUMENTS

| | | |
|---|---|---|
| D. 304,824 | 11/1989 | Hara et al. . |
| D. 339,372 | 9/1993 | Kando . |
| 3,502,814 | 3/1970 | Salaman et al. . |
| 4,635,130 | 1/1987 | Oi .................................. 358/296 |
| 4,696,562 | 9/1987 | Urata et al. . |
| 4,754,300 | 6/1988 | Fukae . |
| 4,839,837 | 6/1989 | Chang . |
| 4,908,714 | 3/1990 | Iriyama et al. .................... 358/405 |
| 4,910,612 | 3/1990 | Yamazaki ........................ 358/496 |
| 4,957,689 | 9/1990 | Ohnishi et al. . |
| 4,959,731 | 9/1990 | Fukae . |
| 4,991,200 | 2/1991 | Lin .................................. 379/100 |
| 5,072,303 | 12/1991 | Silverberg . |
| 5,115,374 | 5/1992 | Hongoh . |
| 5,166,812 | 11/1992 | Dow et al. . |
| 5,175,684 | 12/1992 | Chong . |
| 5,235,674 | 8/1993 | Cohen-Skalli et al. . |
| 5,282,050 | 1/1994 | Ishizuka et al. .................. 358/400 |
| 5,287,158 | 2/1994 | Nagashima et al. .............. 355/309 |
| 5,345,403 | 9/1994 | Ogawa et al. . |
| 5,361,134 | 11/1994 | Hu et al. . |
| 5,452,106 | 9/1995 | Perkins ............................ 358/468 |
| 5,500,859 | 3/1996 | Sharma et al. ................... 370/81 |

OTHER PUBLICATIONS

Brochure—Brother International Corporation—Laser Printing—MFC-3900 ML—Three in One.
Brochure—Brother International Corporation—MFC-4500 ML—Laser Multi-Function Center Features.
Brochure—Canon—MultiPass 1000—Document Processing System.
Brochure—Brother International Corporation—Laser Printing—MFC-4500 ML—Multi-Function Center.
Instruction Book, Canon Fax-L770, p. 22, Jan. 1990.

*Primary Examiner*—Kim Yen Vu
*Attorney, Agent, or Firm*—Swabey Ogilvy Renault

[57] ABSTRACT

A scanner and printer share a same paper feed mechanism. The paper sheets either pass through the scanner first and then to the printer, or a paper path selection switch is provided to select whether the paper in the paper feed mechanism is to be scanned or printed. The apparatus is separately powered and has a controlled power switch to turn on its associated personal computer in response to incoming faxes.

15 Claims, 5 Drawing Sheets

COMBINED SCANNER, PRINTER AND FACSIMILE APPARATUS

This application is a continuation of application Ser. No. 08/527,697, filed Sep. 13, 1995.

FIELD OF THE INVENTION

The present invention relates to a combined scanner, printer and facsimile apparatus for use with a personal computer.

BACKGROUND OF THE INVENTION

For the home or small business user of a personal computer, scanning, faxing and printing are commonly done using three separate apparatus. To be able to fax documents directly from the personal computer, a fax modem is used which is a peripheral device connected to a port of the computer (either internally or externally) and is connected to a telephone line. For printing, a printer is connected to the personal computer through a printer port which is either a serial or parallel data bus. A document scanner for obtaining a digitized image of a document is yet a further peripheral device connected to a port of the computer. As is known in the art, software in the personal computer is used for driving the peripheral devices, i.e. the scanner, printer and fax. This conventional home office or small business personal computer set-up involves three separate peripheral devices, three separate sets of driver software and the use of three ports and communication cables.

In U.S. Pat. No. 5,361,134 (Hu et al) an integrated multifunctional document processing system for faxing, copying, printing or scanning document information and for transmitting and receiving document signals to and from a remote device is described. There is no description in the Hu et al patent of using the same paper source and paper feed path, and therefore, separate systems would be required.

In U.S. Design Patent 339,372 to Kando and assigned to Canon KK of Japan, there is shown a housing for a scanner and printer device. The device would appear to be designed to receiver hand-fed sheets of paper.

U.S. Pat. No. 5,072,303 to Silverberg describes a combined printer and fax without showing an integrated scanner.

U.S. Pat. No. 5,235,674 to Cohen-Skalli shows a controller card for connecting one or more computers to a printer, scanner and fax modem.

U.S. Pat. Nos. 4,959,731 and 4,754,300 to Fukae, assigned to Kentek, describe an electrographic printing apparatus capable of functioning as a copier, printer and telefax machine.

SUMMARY OF THE INVENTION

It is a general object of the present invention to provide a combined scanner, printer and fax device which is easier to use with a personal computer and is of a simplified construction. It is a further object of the invention to provide a device which can be used as a scanner, photocopier, printer and fax modem. It is yet another object of the present invention to provide a device which regroups a plurality of the previously mentioned functions in a same apparatus which may be powered and operated separately from a personal computer while being able to transfer data and control commands with the personal computer. It is also an object of the present invention to provide a combined scanner, printer and facsimile apparatus having a shared paper feed path for the scanner and printer.

According to the invention, there is provided a scanner, printer and facsimile apparatus comprising a paper feed mechanism driven by a motor, a motor controller for the motor, a scanner receiving pages fed by the paper feed mechanism, a printer receiving pages fed by the paper feed mechanism, a scanner controller connected to the scanner and the motor controller, a printer controller connected to the printer and the motor controller, a fax modem having a telephone line connector and an interface controller connected to the scanner controller, the printer controller and the fax modem, the interface controller having a port connectable to a personal computer. In this way, a single data communication link between the personal computer and the apparatus of the invention is used for scanning, printing and faxing, and a single paper feed system is used for the scanner and printer.

Preferably, the invention further comprises means for detecting that a blank page has been fed through the scanner in order to stop the process of scanning a series of pages or in order to stop the process of faxing a series of pages. Such means may comprise software in the personal computer for storing an image of a page scanned by the scanner and then checking the scanned image for the presence of printed matter.

Alternately, the paper feed mechanism may comprise a paper feed switch means for directing sheets of paper selectively to either the scanner or the printer.

Also, the invention preferably comprises means for detecting print on a page being fed to the printer for printing in order to abort or arrest the printing process before a page containing printed matter is printed over by the printer. Such means may comprise software in the personal computer for receiving an image of at least a portion of the page to be printed as scanned by the scanner and determining whether the page is blank. Such means for detecting whether the page already has printed matter on it may additionally comprise means for recognizing whether printed matter corresponds to letterhead or other preauthorized blank form information in which case, the printing process is not arrested or aborted. In the case that unauthorized printed matter is recognized on the page to be printed on, the user of the personal computer may be prompted to continue with the printing process or feed through the printed page without printing new matter on the page using the printer and thus stop the intended printing process temporarily while the pages in the paper feed system are checked, before accepting a restart of the printing process.

BRIEF DESCRIPTION OF THE DRAWINGS

The invention will be better understood by way of the following detailed description of a preferred embodiment of the invention with reference to the appended drawings in which.

DETAILED DESCRIPTION OF THE PREFERRED EMBODIMENT

Figure 1:
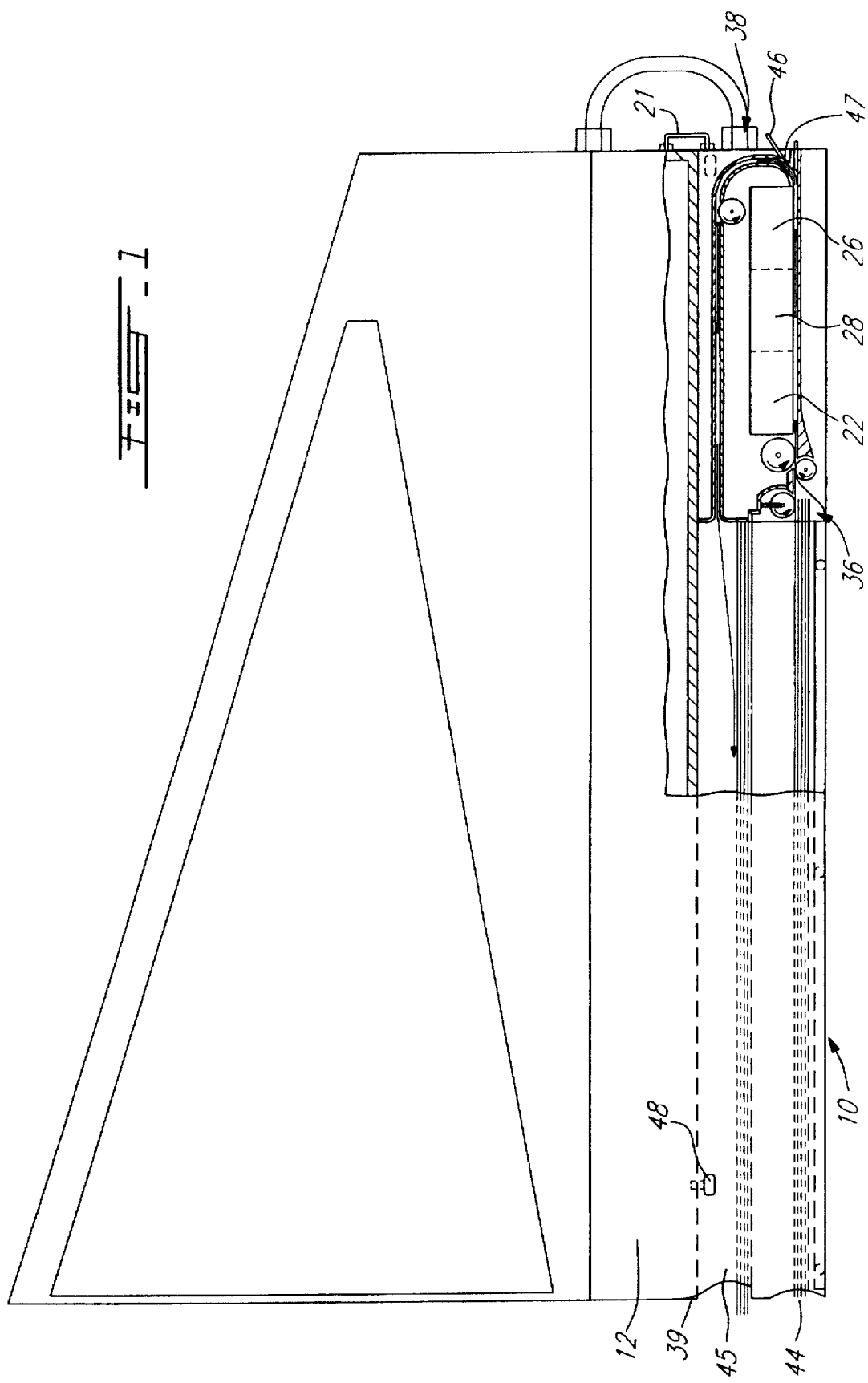
FIG. 1 is a side schematic sectional view of the apparatus according to the preferred embodiment as mounted underneath a computer including an integral monitor.

As illustrated in FIG. 1, the invention according to the preferred embodiment comprises a scanner, printer and facsimile apparatus 10 designed to be of the same dimensions as the base of computer 12 such that a set of four push-button locking members 48 connect the apparatus 10 to the computer 12 to give the appearance of an integral unit. The locking members 48 comprise barbed tabs projecting up into recesses in the base of the computer housing with protrusions on the tabs being accessible from the outside in order to release apparatus 10 from computer 12. The tabs 48 are removable from apparatus 10 so that apparatus 10 may be a stand alone unit with a clear flat upper surface. A sliding tray 44 is provided for holding between 50 and 100 sheets of blank paper or pages of a document to be scanned. As shown in FIG. 1, the tray would be 11 inches deep for holding standard size 8½×11 sheets of paper. If 8½×14 size is required, the sliding tray is expanded and the tray with the paper extends in front of apparatus 10 by 3 inches. The paper is removed from the tray from the top down by a sheet feed mechanism 36 for removing one sheet at a time from the tray. Such sheet feed mechanisms are well known in the art. The paper feed mechanism further comprises additional guide rollers driven to feed the sheets removed from the tray through scanner 22. After passing through the scanner 22, the sheet of paper is fed into printer 28.

Figure 3:
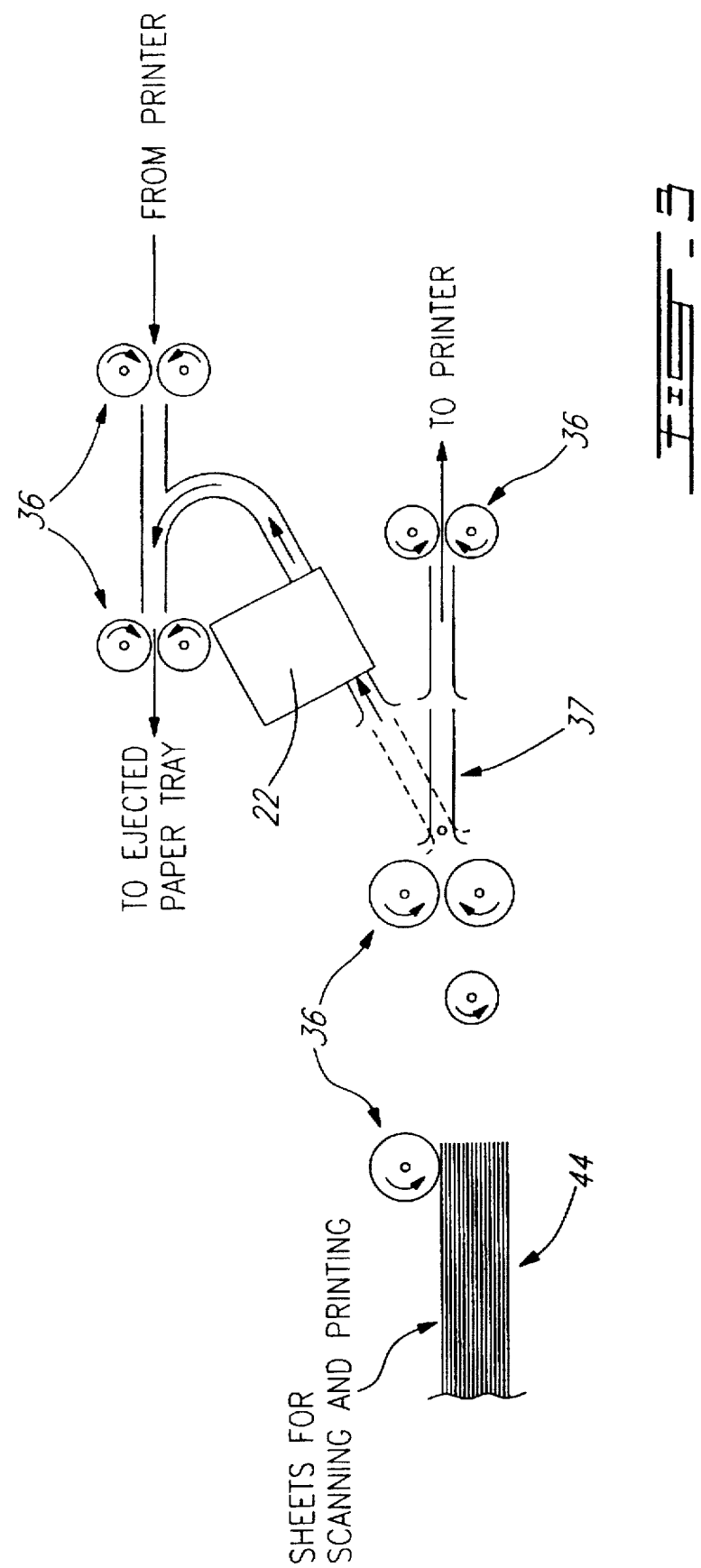
FIG. 3 is a schematic side view illustrating an alternative embodiment having a paper feed switch.

Printer 28 may be any standard type printer, such as ink jet, laser or even dot matrix. As the sheet of paper leaves printer 28, it is fed through an upwardly curved guide slot passing through guide rollers to be driven to return towards the front over the scanner and printer devices to be ejected back onto the ejected paper tray 45 thus effecting a 180° turn in the paper feed path, and a reversal in the direction of the paper moving initially in the horizontal direction towards the rear, as shown in FIGS. 1 and 3, and then through the upwardly curved guide slot (shown in FIG. 1) and backwards towards the front. A portion of the curved guide member for the paper ejected from printer 28 is moveable at 46 to optionally have the paper feed out through a rear slot 47 to fall into a rear paper basket (not shown). The data communication between computer 12 and the scanner 22, printer 28 and fax modem 26 passes through cable connection 21. The a.c. power supply to computer 12 comes from a plug 38 in apparatus 10 so that apparatus 10 may control turning on and turning off computer 12 in response to incoming telephone calls. On the front of apparatus 10, a display 39 comprising an LED to show the ON/OFF state for the scanner, printer and fax modem as well as the state of unviewed or unprinted incoming fax transmissions is provided.

Figure 2:
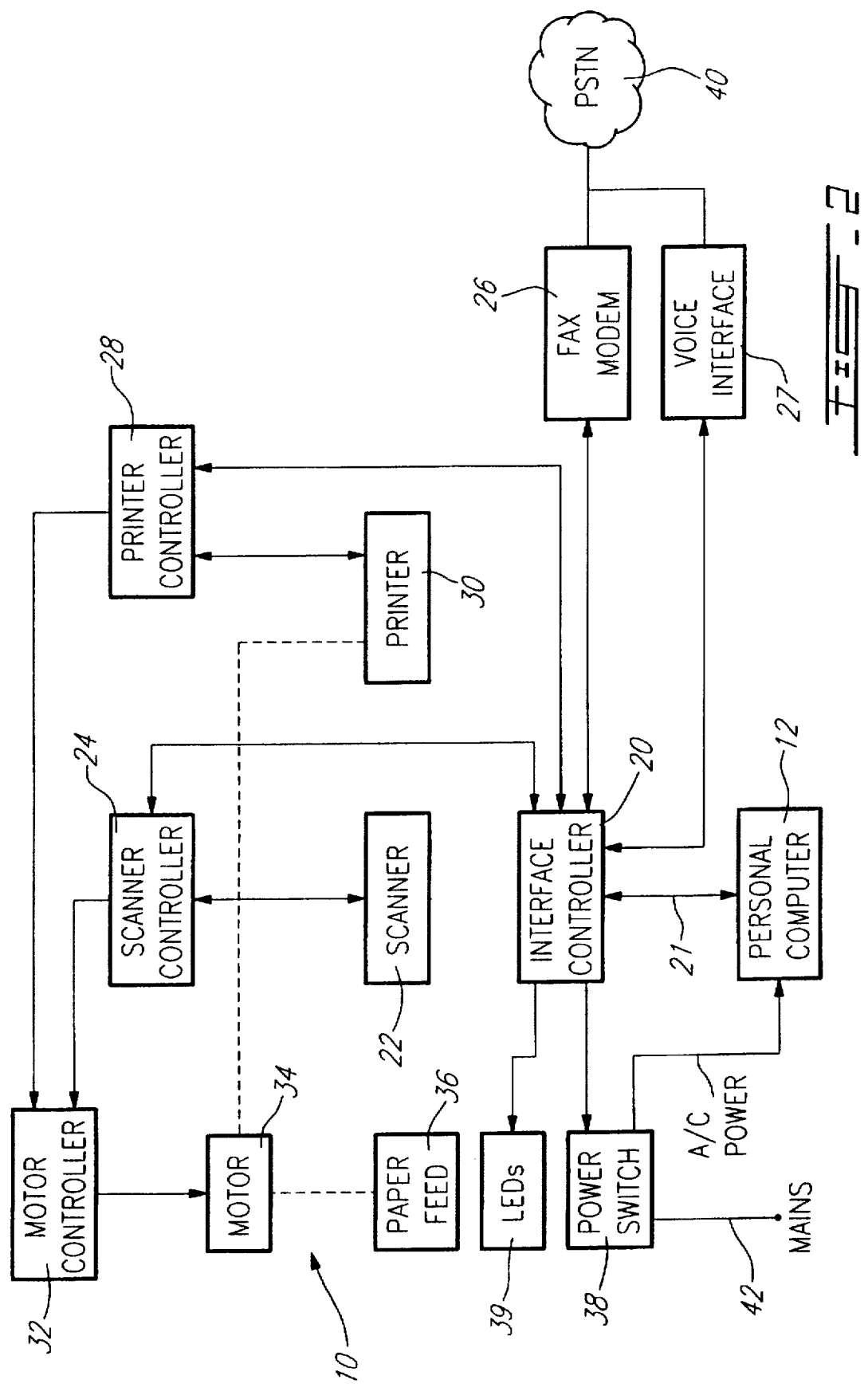
FIG. 2 is a schematic block diagram of the preferred embodiment.

As shown in FIG. 2, apparatus 10 comprises an interface controller 20 having a port for communicating over cable 21 to personal computer 12. The data communicated from personal computer 12 to the controller 20 is then transmitted to one of the scanner controller 24, printer controller 28 and fax modem 26. The fax modem 26 is connected to a telephone line of a public switched telephone network 40. The paper feed mechanism and drive rollers 36 are driven by a drive motor 34 controlled by a motor controller 32. The scanner controller 24 and the printer controller 28 send motor control signals to motor controller 32. In the embodiment illustrated in FIG. 2, motor 34 also drives the paper feed mechanism within printer 30, however, in the case that printer 30 is an integral unit including its own motor drive system, it is possible that use of an external motor 34 for driving the paper feed system within printer 30 is not practical.

In the preferred embodiment, computer 12 has its own a.c. to d.c. power conversion circuit. The computer 12 is plugged into the a.c. power mains 42 via a.c. power switch 38.

Apparatus 10 may be left ON at all times to permit fax reception at all hours or even delayed fax transmission, while computer 12 could be left OFF. When apparatus 10 needs the computer 12 to be ON for the purposes of storing received fax pages on the hard drive of computer 12 or for the purposes of receiving facsimile images for transmission over network 40 to another fax machine, controller 20 may supply power to computer 12 via switch 38. Computer 12 is then configured to automatically run a program which will communicate over cable 21 with controller 20 in order to supply the data that controller 20 is expecting or store the received data from fax modem 26.

In the preferred embodiment, the paper feed path is unique, that is to say, that the sheets of paper removed from tray 44 by the paper feed mechanism 36 pass through the scanner 22 first and then through the printer mechanism 28. In this preferred configuration, it is possible for the scanner to be used for confirming that the sheet to be printed is blank before printing. The scanner 22 and the printer 28 are arranged to scan and print respectively the same side of sheets of paper. Alternatively, the paper feed mechanism may include a selection switch for guiding sheets of paper removed from the tray 44 to one of the scanner 22 and the printer 28.

Figure 4:
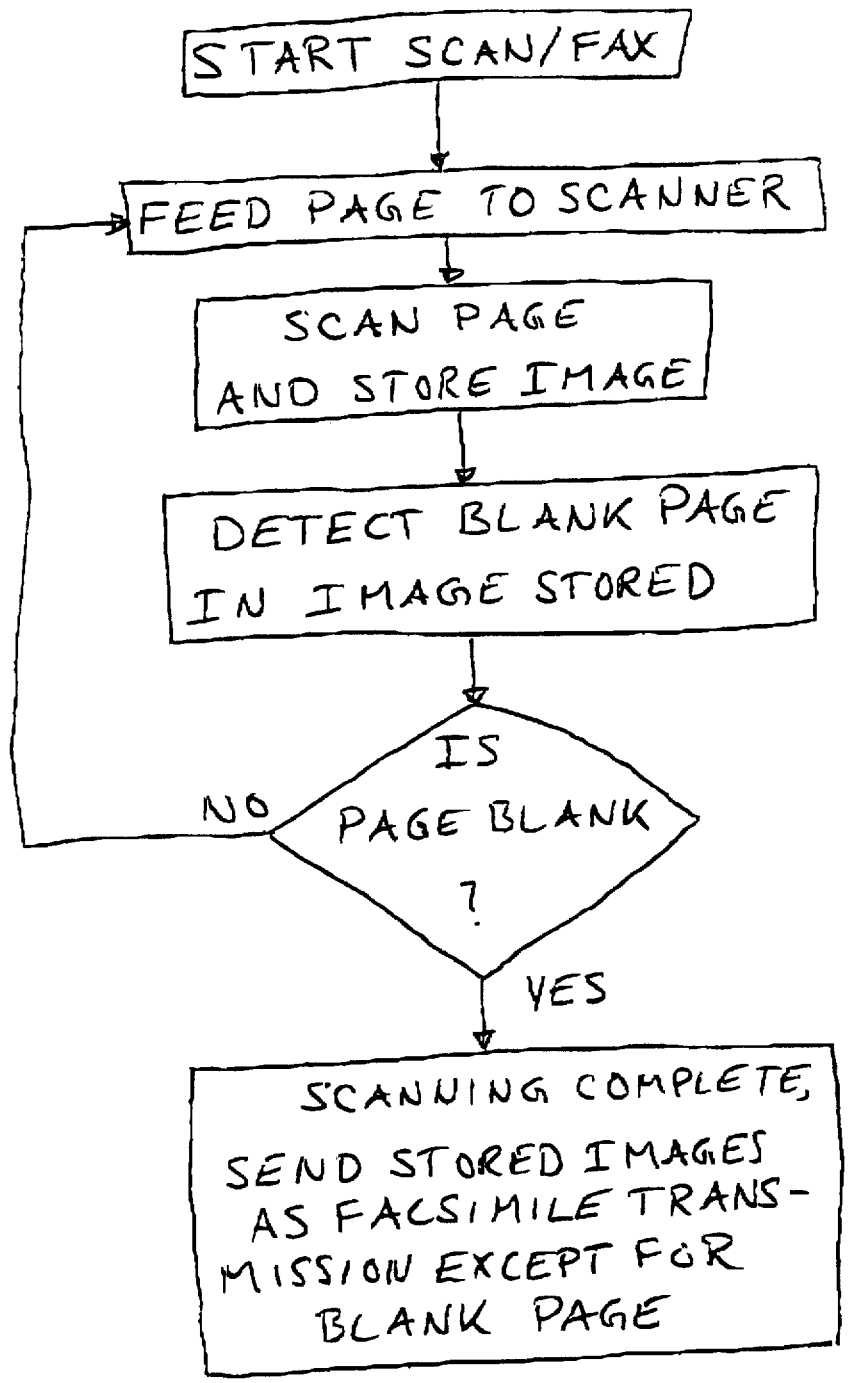
FIG. 4 shows a flow chart illustrating the detection of a blank page during faxing.

In the preferred embodiment, the software in the computer 12 cooperates with apparatus 10 during a scanning operation to provide a scan function for multiple sheets. In this scanning mode, the sheets are scanned and the scanned images are transmitted to computer 12 over cable 21, until such time as a blank sheet is scanned. Detection of the blank sheet is done using a simple detection program either in apparatus 10 or in computer 12. As illustrated in the flow chart of FIG. 4, when the blank sheet is detected, the scanning operation is stopped and the user recovers the scanned sheets including the final blank sheet from tray 45 and can return the final blank sheet back into tray 44.

Figure 5:
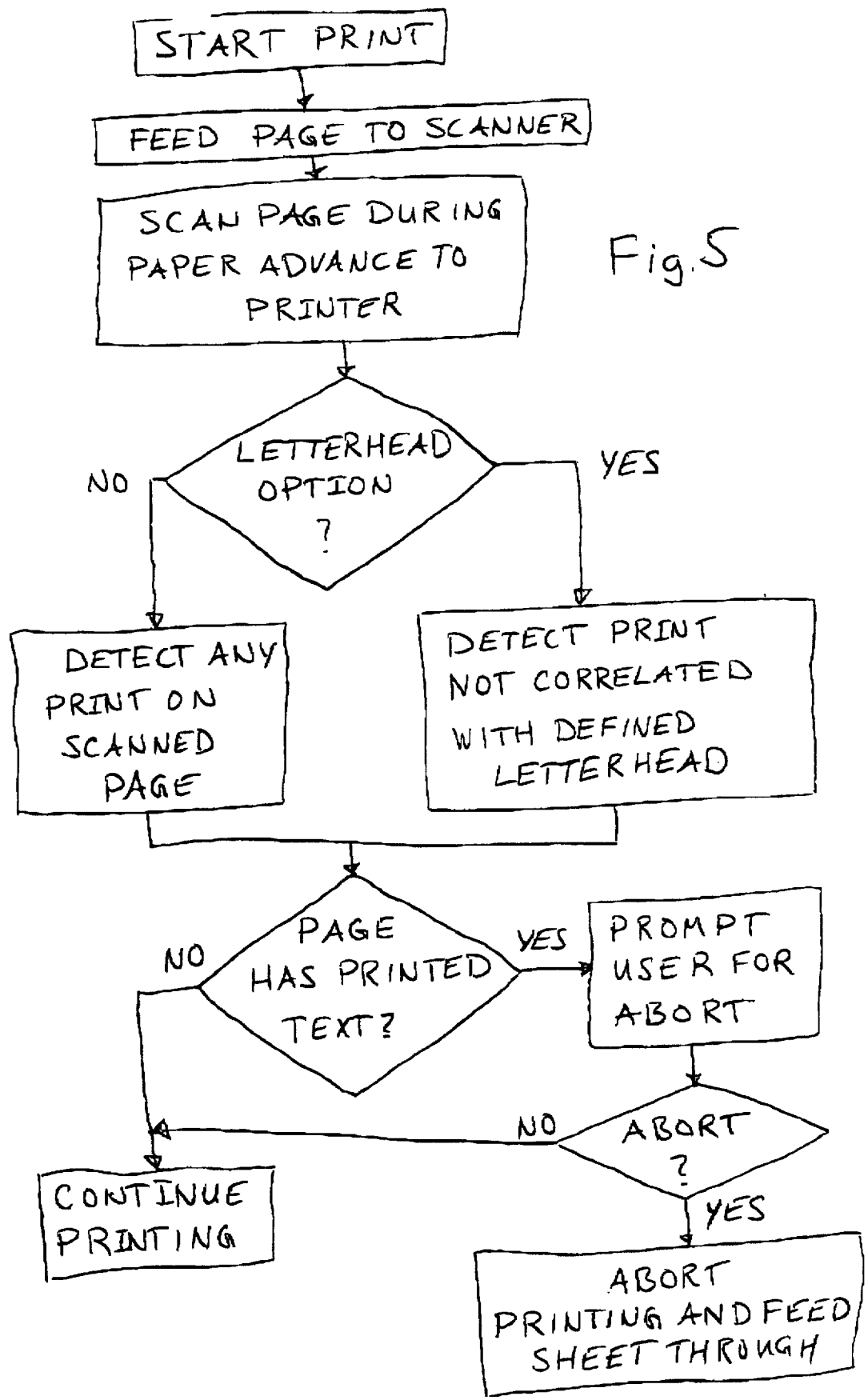
FIG. 5 shows a flow chart illustrating the detection of printed text on a page being fed to the printer.

Similarly, during a printing operation, the scanner remains active to scan the sheet of paper as it is fed towards printer 28. If the scanned portion at the front end of the sheet of paper which has passed under scanner 22 as it is fed into printer 28 is found either not to be blank or not to have a printed matter image with a strong correlation to an accepted letterhead, then the printing function is halted. As illustrated in the flow chart of FIG. 5, software in computer 12 prompts the user to indicate that the printing process should continue on the page containing printed matter loaded in the paper tray. Failure to confirm that printing should proceed will result in the arrested sheet of paper being fed through the paper feed path without further printing and being ejected into the ejected paper tray 45. The user will then be prompted to ensure that the right paper is in the tray 44 before attempting once again to continue with printing.

In the alternative embodiment of FIG. 3, a manually controlled pivotable paper guide member 37 is provided which can be set to allow the paper transported by the paper feed mechanism to be guided in a primary direction towards printer 36 or in a secondary direction towards scanner 22. In the alternative embodiment, feedback is provided so that apparatus 10 knows whether the paper feed path will lead to the printer or to the scanner. The feedback signal may comprise a signal generated by the user in response to a prompt provided by software in computer 12, or a position detector switch may be provided in association with mechanism 37. While the paper guide mechanism 37 is shown to be manually controlled, it could also be controlled by a motor or solenoid mechanism. Thus, in the alternative embodiment, the scanner controller 24 and the printer controller 28 confirm with controller 20 that guide 37 is in the appropriate state before proceeding with a scanning or printing operation.

As can be appreciated, when operating in the scanning mode, the scanned pages can be stored on the hard drive of computer 12 and then subsequently be transmitted by the fax modem 26 for fax operation or may be printed by printer 30 to provide a copier function. In the case that apparatus 10 is to operate in a direct mode, the scanned pages could be immediately faxed by modem 26 by relaying the scanned image data from scanner controller 24 through controller 20 directly to the fax modem 26. In the case of operation as a copier, the interface controller 20 would require enough memory to hold a scanned page in order to be able to subsequently print the scanned page without using the storage capacity of computer 12.

The apparatus 10 according to the invention is also preferably controlled in addition to any separate printer, scanner and fax driver software, by an integrated software package which provides the user of personal computer 12 with a control panel specific to apparatus 10. This control panel software could be prepared for any type of computer hardware and operating system with which apparatus 10 is intended to be used and the control panel software may be included in the package of apparatus 10 in a commercial version thereof. In the case of a conventional graphical user's interface (GUI), a control panel icon specific to apparatus 10 may be provided by the software for the "desk top" of personal computer 12. The control panel gives the user flexibility to scan, fax, print and copy documents from the same application, namely, the control panel. A basic text editor and file management/archive software as is known in the art is included with the control panel software. Preferably, an optical character recognition (OCR) software module is included in the control panel software for converting images of text into editable text files. Such a control panel software gives the user more control on how to manage and create documents in a paperless office.

According to a further preferred feature of the present invention, a voice communications interface 27 is placed in parallel connection with PSTN 40. The voice interface circuit 27 cooperates with fax modem 26 to handle incoming calls either as data or as voice. In some cases, the voice interface 27 is integrated within the same device as the fax modem 26. The object of the voice interface 27 is to provide a digital conversion of the incoming analog voice waveforms from PSTN 40 and also to synthesize outgoing voice waveforms from digital data. With the voice interface 27, software may be provided, either alone in the interface controller 20 or in personal computer 12, in order to provide voice mail functions as is known in the art. Outgoing message data is sent from the interface controller 20 to the voice interface 27 and voice messages coming from PSTN 40 are converted to digital data and sent from voice interface 27 to the interface controller 20. Storage of the voice messages is preferably done on personal computer 12 by sending data over cable 21.

As part of the control panel software, it is possible within the context of the present invention to provide voice recognition software for recognizing voice commands coming from PSTN 40 using the digital signal coming from voice interface 27. Such software would permit a user to call up apparatus 10 using PSTN 40, enter a DTMF security access code to place the control panel software from regular voice mail mode into voice recognition mode. Once in the voice recognition mode, control panel software commands may be executed by voice either by speaking predetermined command key words or by speaking predetermined keyboard keystrokes for activating software functions with confirmations of functions being executed by the control panel software being relayed to the user over PSTN 40 by generating the voice responses at interface 27. As can be appreciated, the use of a voice recognition software module for permitting the user to operate the control panel software allows the user to request the control panel software to fax documents contained within personal computer 12, forward faxes received to a fax machine at an external location, or to send by modem text files from personal computer 12. While somewhat cumbersome, the voice recognition software module could also be used to carry out simple editing of a file in order to implement a correction after which the corrected document could be transmitted to where the user needs it.

As can be appreciated, in the preferred embodiment in which the output of the scanner paper feed is fed directly into the printer paper feed mechanism without using a paper feed switch 37, the user can load the pages to be copied in the paper tray with alternate blank pages between them and allow the scanning and subsequent printing operations to be carried out. If there were an error in the arrangement of the pages, the scanner would pick up the printed matter on the page to be printed during the printing cycle, and the process could be stopped without causing an accident. As can be appreciated, when the storage capacity of computer 12 is used for a photocopying task, any number of sheets may be placed in paper tray 44, the scanning process is carried out automatically and sequentially until a complete blank page is uncovered and ejected into the ejected paper tray, and then subsequently, the printing operation starts to print the scanned pages. The user will find in tray 45 the original pages followed by a blank page and then the copied pages. The control panel software in computer 12 controls the copy image contrast and darkness.

In the case of the preferred embodiment, during a faxing operation, the printer may be used after scanning each page to discretely print in a margin of the page a symbol indicating that the page was scanned for facsimile transmission, such symbol possibly including the page number. This allows the user to confirm whether two pages have been taken together in the paper feed mechanism and scanned as a single page, meaning that the underlying page is never scanned and transmitted. This also allows the user to know the contents of the page identified by the facsimile transmission software as having failed to be transmitted so that the user knows which pages and what information has not been transmitted and needs to be resent.

When the fax modem 26 receives a fax transmission, the fax images are transmitted through controller 20 to computer 12 for storage on the computer's hard drive. Controller 20 will carry out this function even if the printer or scanner is in use. When a transmission is complete, an LED of a row of LEDs 39 is turned ON to indicate that a fax has been received. When complementary software on computer 12 is used to view or print the received images, computer 12 sends a signal to controller 20 that the particular transmission has been viewed or printed, and the LED in question is turned OFF. This feature is useful in the case that apparatus 10 turns ON computer 12 for the purposes of receiving an incoming fax transmission, and then when the transmission is over, turns OFF computer 12 leaving only apparatus 10 active with the LED of LEDs 39 indicating that the user should turn ON his computer in order to view the fax transmission which has been received. The other LEDs on panel 39, in the preferred embodiment, indicate ON/OFF status, scanner in use status, printer in use status, and fax modem in use status as well as the fax transmission received status.

Apparatus 10 could also be integrated within the housing of computer 12, this being of particular advantage in the case of a laptop portable computer.

While the invention has been illustrated with a single fax modem being integrated in apparatus 10, it is alternatively possible to provide a port for connecting a fax modem to apparatus 10 either to operate in addition to fax modem 26 or to replace it. This is advantageous, since a user may wish to expand with two fax modems to be able to send and receive simultaneously on different telephone lines, and since the scanner and printer technology is likely to be useful for a relatively long life span, whereas increases in fax modem transmission speed and/or changes in data communication protocol may urge the user to upgrade that component of the apparatus.

While the invention has been described above with reference primarily to the preferred embodiment and secondarily with reference to an alternative embodiment, it is to be understood that the preceding description is not intended to limit the scope of the present invention as defined in the appended claims.

I claim:

1. A scanner, printer and facsimile apparatus comprising:
a paper feed mechanism driven by a motor for advancing sheets of paper from a paper source;
a motor controller for said motor;
a scanner receiving pages fed by said paper feed mechanism;
a printer receiving pages fed by said paper feed mechanism;
a scanner controller connected to said scanner and said motor controller;
a printer controller connected to said printer and said motor controller;
a fax modem having a telephone line connector; and
an interface controller connected to said scanner controller, said printer controller and said fax modem, said interface controller having a port connectable to a personal computer, wherein said paper feed mechanism includes a paper feed switch means located after said paper source and before said scanner and said printer for directing sheets of paper selectively to either said scanner or said printer, whereby a single data communication link between said personal computer and said apparatus is used for scanning, printing and faxing, and a single paper feed mechanism is used for supplying sheets of paper to said scanner and said printer.

2. The apparatus as claimed in claim 1, wherein said fax modem is external of said apparatus and said apparatus comprises an external port for connecting to said modem.

3. The apparatus as claimed in claim 1, further comprising an indicator display to indicate that a facsimile transmission has been received and not yet viewed or printed, and means for displaying and printing facsimile image data received including means for controlling a state of said indicator display.

4. The apparatus as claimed in claim 1, further comprising a power switch connected to said interface controller for controlling power supply to a computer to which said apparatus is connected to via said port, wherein said personal computer may be turned on, if necessary, in response to an incoming facsimile transmission received by said fax modem so that data of said transmission may be stored in said personal computer.

5. The apparatus as claimed in claim 1, further comprising means for detecting a blank page being scanned, and means for stopping a scanning of multiple pages upon detection of a scanned blank page.

6. A scanner, printer and facsimile apparatus comprising:
a paper feed mechanism driven by a motor;
a motor controller for said motor;
a scanner receiving pages fed by said paper feed mechanism;
a printer receiving pages fed by said paper feed mechanism;
a scanner controller connected to said scanner and said motor controller;
a printer controller connected to said printer and said motor controller;
a fax modem having a telephone line connector; and
an interface controller connected to said scanner controller, said printer controller and said fax modem, said interface controller having a port connectable to a personal computer, wherein said paper feed mechanism comprises a tray for receiving blank paper or documents to be scanned oriented in a given direction, and directs said pages through said scanner and said printer and subsequently about a reversal of direction to be oriented substantially horizontally one of above and below said tray, whereby a single data communication link between said personal computer and said apparatus is used for scanning, printing and faxing, and a single paper feed mechanism is used for supplying sheets of paper to said scanner and said printer.

7. The apparatus as claimed in claim 6, wherein said printer receives pages from said paper feed mechanism after having passed through said scanner.

8. The apparatus as claimed in claim 7, further comprising means for detecting a blank page being scanned, and means for stopping a scanning of multiple pages upon detection of a scanned blank page.

9. The apparatus as claimed in claim 7, further comprising means for printing an identification in a margin of a page being scanned to identify that the page has been scanned, whereby the identification may be used to confirm pages which have been successfully faxed.

10. The apparatus as claimed in claim 7, further comprising detecting means connected to said scanner controller and to said scanner for receiving an image of a page being fed to said printer and for generating a print abort signal if a scanned portion of said page is one of not blank and not correlated with a predetermined letterhead image.

11. The apparatus as claimed in claim 6, wherein said paper feed mechanism comprises a paper feed switch means for directing sheets of paper selectively to either said scanner or said printer.

12. The apparatus as claimed in claim 6, further comprising means for changing a path of said paper feed mechanism to allow said pages to be fed directly to an opposite side of said scanner and said printer without being curved about said 180° turn.

13. The apparatus as claimed in claim 1, further comprising means for confirming that said paper feed switch means are in the proper state for scanning when carrying out scanning operations, and is in the proper state for feeding pages to said printer when in a printer mode.

14. The apparatus as claimed in claim 6, wherein said apparatus is provided in an integral housing constructed to support on its upper surface said personal computer, and said housing is provided with means to releasably connect to said personal computer and said upper surface has substantially a same shape as a bottom surface of said personal computer, whereby the appearance of an integral or modular computer and scanner, printer, facsimile and copier apparatus is provided.

15. A scanner, printer and facsimile apparatus comprising:

a paper feed mechanism driven by a motor;

a motor controller for said motor;

a scanner receiving pages fed by said paper feed mechanism;

a printer receiving pages fed by said paper feed mechanism;

a scanner, controller connected to said scanner and said motor controller;

a printer controller connected to said printer and said motor controller;

an integral housing constructed to support on its upper surface a personal computer and housing said paper feed mechanism, said motor controller, said scanner, said printer, said scanner controller and said printer controller, said housing being provided with means to releasably connect to said personal computer and said upper surface having substantially a same shape as a bottom surface of said personal computer, whereby the appearance of an integral or modular computer and scanner, printer, facsimile and copier apparatus is provided;

a fax modem having a telephone line connector; and an interface controller connected to said scanner controller, said printer controller and said fax modem, said interface controller having a port connectable to a personal computer, whereby a single data communication link between said personal computer and said apparatus is used for scanning, printing and faxing, and a single paper feed mechanism is used for supplying sheets of paper to said scanner and said printer.

* * * * *